United States Patent [19]
Little

[11] 3,837,417
[45] Sept. 24, 1974

[54] CONTROL MEANS FOR FLUID TRANSLATING DEVICE
[75] Inventor: William E. Little, Mediapolis, Iowa
[73] Assignee: J. T, Case Company, Racine, Wis.
[22] Filed: Jan. 23, 1973
[21] Appl. No.: 326,032

[52] U.S. Cl. .................................. 180/6.48, 74/491
[51] Int. Cl. ........................................... B62d 11/04
[58] Field of Search ........... 180/6.48, 77 H; 280/89, 280/94; 74/491, 512, 503

[56] References Cited
UNITED STATES PATENTS

| | | | |
|---|---|---|---|
| 1,750,559 | 3/1930 | Adams | 280/94 X |
| 2,853,200 | 9/1958 | Beyerstedt | 74/491 X |
| 2,998,211 | 8/1961 | Evans | 74/512 X |
| 3,605,519 | 9/1971 | Heggen | 180/6.48 X |
| 3,616,869 | 11/1971 | Rilling | 180/6.48 |
| 3,722,314 | 3/1973 | Sorenson et al. | 74/512 |

Primary Examiner—Robert J. Spar
Assistant Examiner—Leslie J. Paperner
Attorney, Agent, or Firm—Dressler, Goldsmith, Clement & Gordon, Ltd.

[57] ABSTRACT

The present invention relates to a control means for actuating a fluid translating device in opposite directions from a neutral position and automatically returning the translating device to the neutral position when the actuating force is released. The control means includes a control lever connected to the translating device through linkage means which incorporates a rigid link having two spaced fixed restraining means. A pair of spaced abutments are carried by the link between the restraining means and are axially movable on the link. A pair of fixed stops are positioned at axially spaced locations adjacent the link with biasing means between the abutments for urging the abutments into engagement with the stops to define the neutral position for the translating device. Actuation of the translating device will cause one of the restraining means to move the associated abutment away from the fixed stop and compress the biasing means. The biasing means will therefore automatically move the translating device to the neutral position when the actuating force is released.

1 Claim, 2 Drawing Figures

PATENTED SEP 24 1974  3,837,417

CONTROL MEANS FOR FLUID TRANSLATING DEVICE

BACKGROUND OF THE INVENTION

Numerous vehicles of the track or wheel type to perform various material handling operations have been proposed. One type of vehicle that recently has received a remarkable degree of attention is a small unit wherein all four wheels of the unit are driven and the steering or turning movement is accomplished by driving the pair of wheels on one side of the vehicle in one direction while the second pair of wheels is either in a neutral condition or driven in the opposite direction.

These vehicles have been generally referred to as skid steer vehicles. One type of skid steer vehicle that is presently commercially available incorporates fluid translating devices as the power train between the engine and the respective pairs of wheels. In order to simplify the construction and reduce the cost of vehicles of this type, the actuation of the fluid translating devices is controlled through manual control levers that respectively cooperate with the translating devices on opposite sides of the vehicle and the fluid translating devices are maintained in engagement by manual force applied to the control levers.

With devices of this type, one of the problems encountered is the return of the power train to the neutral position when the manual force on the control lever has been removed. While numerous types of mechanisms that have been proposed to neutralize control systems, most of these devices are extremely expensive and require a substantial amount of maintenance.

SUMMARY OF THE INVENTION

The present invention contemplates a control mechanism for a fluid translating device which incorporates a neutralizing means that assures quick and positive return of the controls to a neutral position without any attention by the operator. The neutralizing means or centering device eliminates the need for field adjustments that were heretofore necessary in known centering mechanisms.

The present invention is incorporated into the control means for a skid steer vehicle that has a body with first and second ground engaging members on opposite sides of the body and a prime mover connected to the respective ground engaging members through individual fluid translating devices. The control means is connected to the control member of an associated fluid translating device to move the member in opposite directions from a neutral position to propel the associated ground engaging members or wheels in the forward and reverse directions. Each control means consists of a manual control lever that is connected to the fluid translating device through linkage means to actuate the device in the forward and reverse directions in response to movement of the control lever in opposite directions from a neutral position.

According to the invention, the self centering mechanism or neutralizing means consists of a pair of spaced fixed restraining means on a rigid link that forms part of the linkage means with a pair of abutments carried by the rigid link between the restraining means and being axially movable on the link. A pair of fixed stops are positioned at axially locations adjacent the link and a single coil spring is located between the abutments and urges them into engagement with the spaced stops.

When the respective abutments are in engagement with the stops, the fluid translating device is in the neutral position and the application of an external force to the control lever will cause one of the restraining means to carry an associated abutment away from the associated stop while the fluid translating device is being actuated. The other abutment will be restrained from movement by the associated stop to thereby compress the spring and the compressive force of the spring will automatically return the fluid translating device and control means to the neutral position when the external force on the control lever is released.

BRIEF DESCRIPTION OF SEVERAL VIEWS OF DRAWINGS

DETAILED DESCRIPTION

Figure 1:
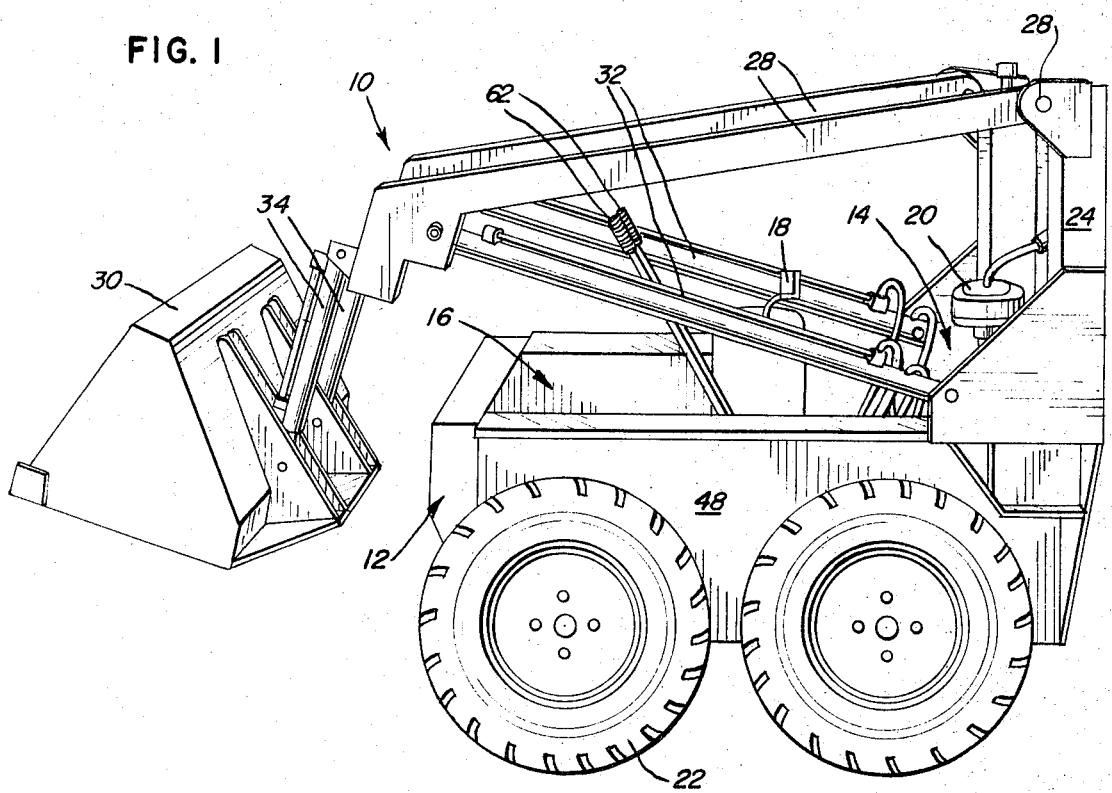
FIG. 1 is a perspective view of a skid steer vehicle having the present invention incorporated therein.

While this invention is susceptible of embodiment in many different forms, there is shown in the drawings and will herein be described in detail one embodiment, with the understanding that the present disclosure is to be considered as an exemplification of the principles of the invention and is not intended to limit the invention to the embodiment illustrated.

FIG. 1 of the drawings shows a skid steer vehicle, generally designated by the reference numeral 10, having the present invention incorporated therein. Vehicle 10 consists of a frame or body 12 that has an engine space 14 adjacent the rear end thereof and a forward space 16 adjacent the front end thereof with seat 18 located intermediate the ends. Engine 20 is located in engine space 14 while forward space 16 is designed for the operator's legs.

The vehicle further includes first and second pairs of wheels or ground engaging members 22 (only one pair being shown) respectively located on opposite sides of body 12. Stanchions 24 project upwardly from the body on each side of the engine space and a lift arm 26 is pivotally secured at 28 on the upper end of each stanchion. The lift arms project forwardly along the body and downwardly adjacent the forward end of the body with a material handling member, such as a bucket 30, pivotally connected to the lower forward ends of the respective lift arms.

Hydraulic fluid rams 32 are positioned between each stanchion and its associated lift arms so that the lift arms may be raised and lowered on the vehicle body. Also, hydraulic fluid rams 34 are located between the material handling member and the lift arms to pivot the material handling member relative to the lift arms.

Figure 2:
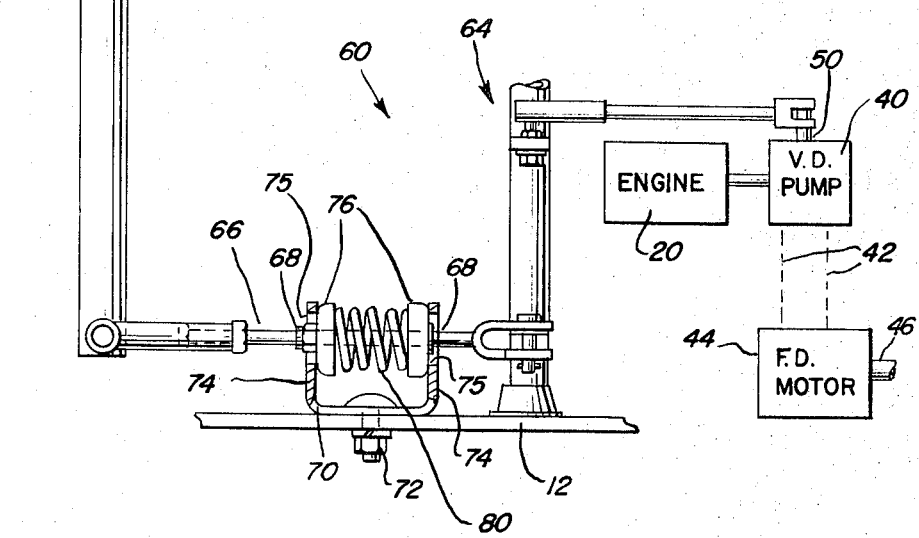
FIG. 2 is a view partly in section of the control means of the present invention.

Each pair of wheels 22 on the respective sides of the vehicle are driven through separate power trains which are identical in construction and only one will be described in detail. As shown in FIG. 2, the power train between the engine and an associate pair of wheels consists of a fluid translating device or variable displacement pump 40 that is driven by engine or prime mover 20 and supplies fluid under pressure through conduits 42 to fixed displacement motor or fluid translating device 44. The fluid translating device 44 has its output shaft 46 connected to the respective wheels 22 through suitable chains (not shown) located in side compartment 48 (FIG. 1) that forms part of the body 12.

The variable displacement pump or fluid translating device 40 has a member 50 that is movable in opposite directions from a neutral position to supply hydraulic fluid under pressure from a source through either of the conduits 42 to thereby propel the wheels 22 in either the forward or reverse directions.

According to the present invention, control member 50 is movable in opposite directions from the neutral position to drive the wheels in either the forward or reverse direction through control means 60 that incorporates mechanism which will allow the operator to manually control the speed and direction of movement of the wheel from the operator's seat and which will automatically neutralize the translating device when the operator releases the control means.

The control means consists of a control lever 62 that is pivoted about a fixed pivot axis on the body of the vehicle. The lower end of control lever 62 is connected to member 50 through linkage means 64 that transmit movement of the manual lever 62 in opposite directions from the neutral position to the control member 50 and condition the power train for operating the wheels in either the forward or reverse direction at varying speeds. Any type of linkage means may be utilized and the linkage illustrated in the drawing is for purposes of illustration rather than of limitation.

According to the invention, the linkage means 62 incorporates a rigid link 66 that is connected to control lever 62. Link 66 has two spaced fixed restraining means 68 secured thereto at axially spaced locations on the link.

Control means 60 also includes a generally U-shaped bracket 70 that is secured to body 12 by screw 72 with spaced legs 74 of the bracket located adjacent the link 64 to define a pair of fixed stops. In the specific embodiment, the legs 74 have aligned openings 75 and link 66 extends through the aligned openings.

Control means 60 further includes a pair of abutments or cups 76 that are slidably supported on link 66 between the spaced restraining means 68. Biasing means in the form of a coil spring 80 encircles the link 66 and has opposite ends received into the respective cups 76 that define the spaced abutments and the biasing means urges the abutments into engagement with the spaced stops 74.

In operation, the coil spring 80 normally maintains the spaced abutments 76 in engagement with the respective stops 74. With the respective restraining means 68 in the position shown in FIG. 2 which is the neutral position for control member 50 as well as manual control lever 62. When manual control lever 62 is moved in either direction from the neutral position shown in FIG. 2, the linkage means 64 will transmit the motion of the manual control lever to the member 50 and actuate a fluid translating device 40 for supplying fluid to motor 44. During this movement, one of the restraining means moves the associated abutments 76 away from the associated fixed stop, defined by leg 74, while the other abutment 76 is held by the other fixed stop and is moved axially of the link 66. This will compress the spring 80 and the control member will be in the operative or actuated position so long as a manual force is applied to the upper end of control lever by the operator. When the operator releases the manual control lever, the compressive force of the spring returns the abutment to the position shown in FIG. 2 which automatically places the fluid translating device in the neutral position. All of this is accomplished in a quick and positive manner with only a minimum number of pairs.

The single spring utilized in connection with the steering mechanism has considerable advantage over a two spring arrangement which requires many more parts as well as constant adjustment to assure that the centering mechanism is in a proper position to return the various parts to the neutral condition.

While link 66 has been shown as part of the linkage means between control lever 62 and control member 50, it will be appreciated that this link could be separate and connected to the control lever or control member.

I claim:

1. In a skid steer vehicle having a vehicle body with first and second ground engaging members on opposite sides of the body, a prime mover, first and second fluid translating devices connecting said prime mover to the respective ground engaging members for operation in the forward and reverse directions, each fluid translating device having a member movable in opposite directions from a neutral position, and separate control means for each member, each control means including a control lever movable in opposite directions from a neutral position, linkage means connecting each control lever with the member of an associated fluid translating device to actuate the fluid translating device in response to movement of the associated control lever, said linkage means including a link having two spaced fixed restraining means; a pair of cups carried by said link between said spaced restraining means and being movable axially of said link; a U-shaped bracket having two spaced legs defining a pair of fixed stops at axially spaced locations adjacent said link, said legs having aligned openings with said link extending through said openings; and a coil spring encircling said link and having opposite ends received in the respective cups for urging said cups into engagement with said stops to define the neutral position for the movable member of the associated fluid translating device, said restraining means moving an associated cup away from the associated stop when the movable member is actuated by an external force applied to the control lever while the other cup is restrained from movement by the associated stop means to compress the biasing means so that the compressive force of said biasing means returns the control member to the neutral position when the external force is released.

* * * * *

UNITED STATES PATENT OFFICE
CERTIFICATE OF CORRECTION

Patent No. 3,837,417　　　　　　　　　　Dated September 24, 1974

Inventor(s) William E. Little

It is certified that error appears in the above-identified patent and that said Letters Patent are hereby corrected as shown below:

In the cover page change the Assignee from "J. T, Case Company" to --J. I. Case Company--

Column 1, line 67, after "axially" insert --spaced--

Signed and sealed this 17th day of December 1974.

(SEAL)
Attest:

McCOY M. GIBSON JR.　　　　　　　C. MARSHALL DANN
Attesting Officer　　　　　　　　　Commissioner of Patents

FORM PO-1050 (10-69)